United States Patent [19]

Byerley

[11] Patent Number: 5,089,077
[45] Date of Patent: Feb. 18, 1992

[54] APPARATUS FOR MANUFACTURING MULTIPLE-PLY TIRE CARCASSES

[75] Inventor: Mark S. Byerley, Greenback, Tenn.
[73] Assignee: WYKO, Incorporated, Greenback, Tenn.
[21] Appl. No.: 490,366
[22] Filed: Mar. 8, 1990
[51] Int. Cl.[5] .................... B32B 01/08; B29D 30/30
[52] U.S. Cl. .................... 156/351; 156/363; 156/406.2; 156/126; 156/133
[58] Field of Search ............ 156/405.1, 406.2, 415, 156/417, 418, 421.8, 126, 133, 350, 351, 361, 362, 363, 367, 368, 379, 396

[56] References Cited

U.S. PATENT DOCUMENTS

| | | | |
|---|---|---|---|
| 2,416,523 | 2/1947 | Haren et al. | 156/418 |
| 2,819,075 | 1/1958 | Noon | 271/97 |
| 3,901,756 | 8/1975 | Wireman et al. | 156/367 |
| 3,909,336 | 9/1975 | Takahashi et al. | 156/406.2 |
| 4,105,486 | 8/1978 | Cantarutti | 156/126 |

Primary Examiner—Michael W. Ball
Assistant Examiner—Francis Lorin
Attorney, Agent, or Firm—Luedeka, Hodges, Neely & Graham

[57] ABSTRACT

A multiple-ply tire carcass building apparatus is described. A collapsible/expandable tire band applier is used to sequentially apply a plurality of cylindrical tire bands onto a collapsible tire building drum to form the multiple-ply tire carcass. An air nozzle or a plurality of air jets are longitudinally extend over a portion of the longitudinal surface of the tire building drum and any tire bands thereon and is spatially separated therefrom for facilitating the placing of the tire band onto the tire building drum. Preferably, a selectively positionable light sensing means carried by an expandable with the band applier is utilized to automatically and accurately provide the band applier with an outer diameter slightly less to slightly greater than that of the tire building drum and any tire band thereon so that the tire band can be displaced from the band applier onto the tire building drum. The light sensing means is also selectively positionable to provide the leading end of the air nozzle with an initial clearance from the tire building drum during the positioning of the band applier in a working relationship with the tire building drum and provide the air nozzle or air jets with the desired spatial separation from the surface of the drum and any tire bands already thereon.

17 Claims, 7 Drawing Sheets

APPARATUS FOR MANUFACTURING MULTIPLE-PLY TIRE CARCASSES

BACKGROUND OF THE INVENTION

The present invention relates generally to the manufacture or building of tires by sequentially applying a plurality of concentrically disposed tire bands onto a tire building drum to form a multiple-ply tire carcass, and more particularly to an improvement in the apparatus for applying the bands onto the tire drum.

Tire carcasses utilized for the manufacture of tires are generally formed of a plurality of plies of rubber with suitable fillers and reinforcing material disposed between the plies. The tire carcasses are typically assembled by sequentially placing a selected number of elongated cylindrical tire bands onto a collapsible elongated cylindrical tire building drum to form a concentric, layered stack of tire bands, each of which defines a ply of the tire. After assembling the tire carcass, the cylindrical drum is collapsed and the tire carcass is removed for subsequent processing into the finished tire.

The placement of the tire bands onto the tire building drum to form the tire carcass has been previously achieved by employing several different types of apparatus. One such apparatus found to be particularly suitable for applying the desired number of concentrically disposed tire bands on the tire building drum is a selectively expandable/collapsible band applicator or applier. This band applier comprises a plurality of elongated, longitudinally extending rollers circumferentially spaced about and supported on a central longitudinally extending tube. The tube is cantileveredly supported at one end thereof by a horizontally pivotable housing and is longitudinally displaceable to move the rollers carried thereby along the rotational axis of the tire building drum for aligning the band applier with the tire building drum. The rollers are connected to the central tube by expandable and contractible scissor-like couplings which function to displace the elongated rollers radially away from or toward the centrally disposed support tube for varying the outer diameter of the band applier as defined by the outer surface of the elongated rollers. An elongated drive roller positioned at an angle to the rotational axis of the tire building drum is used for rotating and displacing the tire band from the band applier onto the tire building drum and is connected to the central tube by scissors-like couplings essentially similar to those used with the aforementioned rollers so as to be radially displaced along with these rollers during the expansion or contraction of the band applier. With the band applier in a collapsed condition, an elongated cylindrical tire band is placed in an encompassing relationship over a length of the elongated rollers and the drive roller. The band applier with the tire band thereon is then aligned with the tire building drum so that the central tube is coextensive with the rotational axis of the tire building drum. The central tube of the band applier along with the rollers attached thereto is then longitudinally displaced for moving the end of the band applier to a location contiguous to the outboard end of the tire building drum.

Coincident with or substantially coincident with the longitudinal displacement of the central tube, the band applier is radially expanded through a suitable drive coupled to the scissors-like couplings to provide the rollers on the band applier with an outer diameter in a range of slightly less than to slightly greater than the outer diameter of the tire building drum. The drive roller is canted at an angle to the rotational axis of the tire building drum to help displace the tire band from the band applier onto the tire building drum. The drive roller bears against the inside surface of the tire band and rotates the tire band at a rotational speed essentially corresponding to the rotational speed of the tire building drum and the tire band is moved longitudinally along the rollers by the angled drive roller and onto the tire building drum.

To facilitate movement of the tire band from the band applier onto the tire building drum, an elongated air nozzle is carried by the band applier at the leading end of the drive roller and is radially positionable with the drive roller. During the axial movement of the expanded band applier, the air nozzle is to be positioned at a location radially spaced from the outer surface of the tire building drum and any band previously placed on the drum surface. When a tire band is moved about half-way onto the tire building drum by the drive roller and extends over the air nozzle an air stream directed through the end of air nozzle will flow between the tire band being applied and the surface of the tire building drum or the outer surface of a previously applied band to assist in moving the band the remaining distance onto the tire building drum. The air nozzle, like the drive roller, is also canted at an angle with respect to the rotational axis of the tire building drum to help pull the leading edge of the tire band across the gap between the band applier and the tire drum until the air stream from the nozzle has a chance to start pushing the tire band onto the tire building drum. The longitudinal center of the tire band is marked with a suitable mark so that when the center of the tire band reaches the center of the tire building drum the mark is detected with a suitable sensor and the air stream through the air nozzle is terminated. The band applier is then axially retracted away from the tire building drum and collapsed for receiving a further tire band.

Details pertaining to the tire building drums of the type which may be satisfactorily used in combination with the band applier as modified by the present invention are set forth in U.S. Pat. Nos. 3,375,154; 4,636,277; and 4,780,171. These references are incorporated herein by reference.

While the band applier as previously constructed and as generally described above provided a mechanism for applying tire bands onto tire buildings drums there was found to be some attendant shortcomings or problems which detracted from the overall efficiency and operability of the band applier. These problems were primarily due to the lack of suitable control over the extent of and timing of the expansion of the band applier in order to provide the latter with the proper diameter required for applying the tire band carried by the band applier onto the tire building drum and without stretching the band by an unnecessary amount. Importantly, the individual bands, when relaxed after being stretched, do not rebound fully to their prestretched dimensions. Thus, for example, if the band on the band applier was expanded to a diameter more than about four inches greater than the outer of diameter of the tire building drum and any tire bands previously placed thereon, the band often would not rebound and thus being oversized, wrinkles occurred in the applied band due to over expansion of the band. Also, changes in the band ply angle occurred. These wrinkles, which are troublesome and difficult to remove, considerably detract from the efficiency of the band applier. On the other hand, if the band applier was not expanded sufficiently, i.e., to a diameter less than the outer diameter of the tire building drum and any band previously applied thereon, the tire band may not be displaceable from the band applier onto the tire building drum. Another problem was found to be present in the timing of the radial expansion of the band applier when using the air nozzle to facilitate the moving of the band onto the tire building drum. This problem arises when the band applier is not expanded sufficiently during the axial or longitudinal displacement of the band applier towards the tire building drum to permit the passage of the air nozzle over the outboard end of the tire building drum and any bands thereon so as to cause the air nozzle to impact against the end of the tire building drum and effectively interrupt the tire building operation. A further difficulty was experienced when using tire building drums of different diameters due to the problems encountered in adjusting the roller diameter to the outer diameter of the tire building drum within a fairly wide range of diameters.

These problems or shortcomings were also found to be increasingly difficult to overcome during the building of multiple-ply tire carcasses requiring the placement of several tire bands on the tire building drum since the effective diameter of the tire building drum increased with the application of each tire band. Also, with the application of each tire band, the space between the outboard end of a tire building drum and a band applier during its axial displacement towards the tire building drum was decreased by the thickness of the tire band. This decrease in space required that sufficient expansion of the band applier be achieved at a time sooner than that required for a previously applied band in order to assure passage of the air nozzle over the outboard end of the tire building drum and any tire bands thereon.

SUMMARY OF THE INVENTION

It is therefore an or object of the present invention to modify or improve the aforementioned band applying apparatus by providing it with an expansion control system which is capable of sensing the effective diameter of the tire building drum regardless of the diameter of the drum within a relatively large range of diameters and the presence of one or more previously applied tire bands on the tire building drum. In this control system, the drum diameter is utilized in providing a signal to the expansion drive of the band applier for controlling the expansion of the band applier during the longitudinal displacement thereof towards the tire building drum in order to assure that the band is properly expanded to the desired diameter, without over expansion, for the application of the tire band onto the tire building drum as well as to assure the passage of the air nozzle, or air jets if used in place of the air nozzle, radially outwardly from the tire building drum adjacent its outboard end.

Generally, the foregoing objective is achieved by the modification of the apparatus used for the manufacture of tires having a multiple-ply carcass incorporating a plurality of tire bands. The apparatus is used in combination with an elongated cylindrical drum means rotatable about a longitudinal axis for sequentially receiving about the peripheral surface thereof a plurality of cylindrical tire bands disposed in a concentric, layered arrangement. The apparatus comprises the combination of an elongated radially expandable and collapsible band applying means positionable along the longitudinal axis of the drum means for supporting thereabout a tire band of an elongated cylindrical configuration and for displacing the tire band therefrom over the peripheral surface of the drum means. Drive means are provided for radially expanding or collapsing the band applying means away from or towards the longitudinal axis. Further drive means are provided for displacing the band applying means along said longitudinal axis towards the cylindrical drum means for positioning the outboard end of the band applying means at a location contiguous to one end of the cylindrical drum means. Preferably, an elongated air nozzle means is disposed on said outboard end of the band applying means and extends therefrom along a longitudinal plane parallel to said longitudinal axis for positioning a substantial portion of the air nozzle means at a location radially outwardly from the peripheral surface of the drum means and any tire band thereon when the end of the band applying means is contiguous to the drum means. Alternatively, a plurality of elongated, longitudinally extending air jets disposed about the periphery of the band applying means at the outboard end of several idler rollers can be used in place of the air nozzle to provide the layer of high-pressure air between the tire band being applied and the tire building drum and any tire band previously placed thereon.

Sensing means are disposed at said outboard end of the band applying means and are radially expandable therewith for sensing a signal beam of light or sonic waves extending from a location adjacent to the end of the drum means opposite the aforementioned one end of the drum means over the peripheral surface of the drum means and any band thereon along a path at an angle to the longitudinal axis of the drum means. The signal beam sensing means are coupled to the first mentioned drive means for providing signals to the first mentioned drive means at least during the displacement of the band applying means towards the drum means for respectively effecting radial expansion of the drum applying means in response to the sensing means being blocked from the signal beam by the drum means and any band thereon and for interrupting the radial expansion of the band applying means in response to the sensing means receiving the signal beam.

The radial expansion of the band applying means is continued in an incremental manner through a series of interruptions due to the signal beam sensing mean being sufficiently radially displaced along with the band applying means to sense the signal beam in order to ultimately provide the tire band supportable by the band applying means with an inner diameter slightly less to slightly greater than the outer diameter of the drum means and any band thereon for facilitating the displacement of the band from the drum applying means onto the drum means and over any band thereon.

A further object of the present invention is to provide for sufficient radially expansion of the tire band applier during the longitudinal displacement of the band applier towards the cylindrical tire building drum to provide for the passage of the air nozzle under or radially outwardly from the outboard end of the drum with a spatial separation therefrom in the range from about one-fourth to about five-eighths inch.

Another object of the present invention is to provide for sufficient radially expansion of the tire band applier during the longitudinal displacement of the band applier towards the cylindrical tire building drum to provide for the passage of the air jets at the outboard end of several of the rollers radially outwardly from the outboard end of the drum with a spatial separation therefrom in the range from about three-eighths to about three-fourths inch.

Another object of the present invention is to provide for the vertical adjustment in the position of the signal beam sensing means in relation to its support and the rollers for varying the effective outer diameter of the expanded band applier with respect to the outer diameter of the tire building drum.

A still further object of the present invention is to provide for the angular adjustment of the signal beam sensing means to provide a mechanism for varying the spatial separation of the air nozzle from the outer surface of the tire building drum when the band applier is in a position contiguous to the tire building drum.

A still further object of the present invention is to provide means for providing a beam of light defining the signal beam and light sensing means defining the signal beam sensing means for sensing the beam of light.

Other and further objects of the present invention will become obvious upon an understanding of the illustrative embodiments about to be described or will be indicated in the appended claims. And various advantages not referred to herein will occur to one skilled in the art upon employment of the invention in practice.

Preferred embodiments of the invention have been chosen for the purpose of illustration and description. The preferred embodiments are not intended to be exhaustive nor to limit the invention to the precise forms disclosed. They are chosen and described in order to best explain the principles of the invention and their application and practical use to thereby enable others skilled in the art to best utilize the invention in various embodiments and modifications that are best adapted to the particular use contemplated.

DETAILED DESCRIPTION OF THE INVENTION

With particular reference to FIGS. 1 through 6, the tire carcass building apparatus generally indicated at 10 is shown comprising a rotatable tire building drum 12 and a collapsible/expandable tire band applier 14. The band applier 14 cooperates with the drum 12 for building tire carcasses formed of multiple plies defined by a plurality of tire bands sequentially applied from the band applier 14 onto the rotatable tire building drum 12 in a layered, concentric arrangement.

Figure 1:
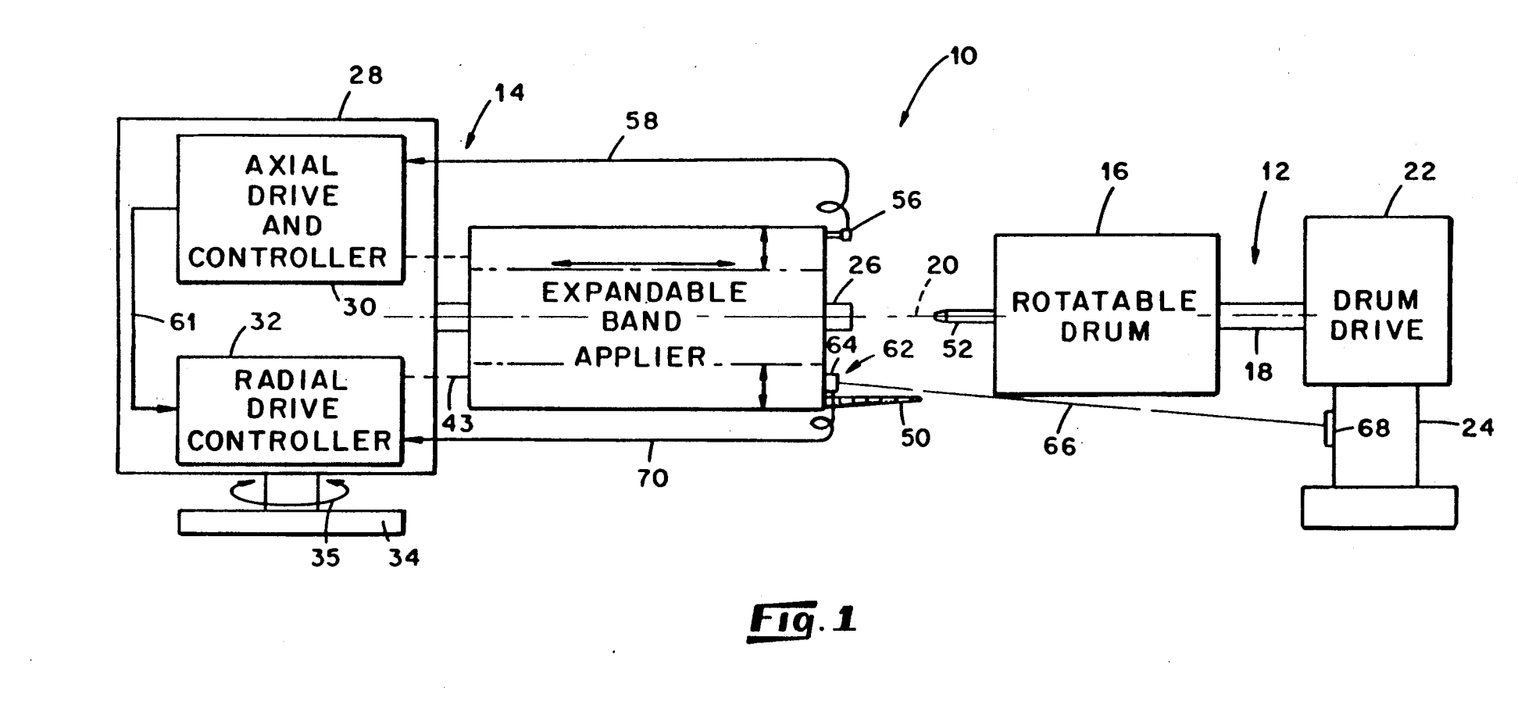
FIG. 1 is a schematic block diagram showing the general arrangement of a rotatable tire building drum and the expandable band applier incorporating the improvement provided by the present invention.

The tire building drum 12 normally comprises a collapsible, cylindrical drum 16 which is cantileveredly supported on a drive shaft 18 and rotatable about a longitudinal axis 20 by a drum drive 20 provided by a suitable electric motor and gear train mounted on a suitable base support 24 that is capable of rotating the drum 16 at a predetermined rotational speed. The particular construction of the rotatable tire building drum 12 is not at the point of invention and could be of any suitable commercially available type such as described in the aforementioned patents.

The collapsible/expandable tire band applier 14 is shown comprising an elongated central tube 26 which is longitudinally extendable in a horizontal plane in axial alignment with the rotational axis 20 of the rotatable tire building drum 16. This central tube 26 is supported at one end thereof by a housing 28 which also contains the various drives and controls required for the operation of the band applier 14. These drives and controls include an axial drive and controller 30 and a radial drive and controller 32 which may be of any suitable type such as a pneumatic, hydraulic, or electric drive that is controlled manually or by a micro-processor. The housing 28 is attached to a base 34 and is pivotable in a horizontal plane on the base 34, as generally indicated by the arrow 35, for positioning the band applier 14 in a horizontal plane removed approximately 45 degrees from the rotational axis 20 of the tire drum 16 for loading an elongated cylindrical or annular tire band as generally shown at 36 onto the collapsed tire band applier for placement on the tire building drum 16. After the loading the tire band 36 onto the collapsed band applier 14, it is pivoted into alignment with the rotational axis 20 of the rotating tire building drum 16.

A plurality of elongated, longitudinally extending rollers 38 are disposed at circumferentially spaced apart locations about the periphery of the central tube 26. These rollers 38 are attached to the tube 26 by a pivotable hinge arrangement which comprises longitudinally moveable arms 40 attached to a fixed arm 42 which function together to provide a scissors-like movement upon the longitudinal displacement of the moveable arms 40 for radially displacing the rollers 38 away from or towards the central tube 26 while maintaining the elongated rollers 30 in horizontal planes parallel to the central tube 26. These moveable arms 40 are attached to and may be coupled to the radial drive controller 32 by a suitable tubing arrangement or any other suitable coupling as generally shown at 43 in FIG. 1. The moveable arms 40 support the rollers 38 through bearing-containing supports 44 which provide for the rotation of the rollers 38 with respect to the central tube.

Figure 6:
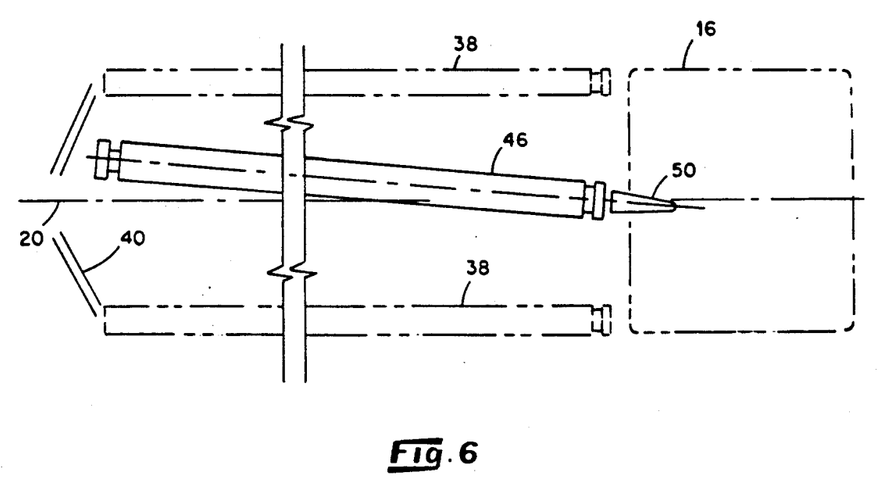
FIG. 6 is a schematic bottom view of the band applier showing the angle which the drive roller and air nozzle is canted with respect to the rotational axis of the tire building drum for facilitating the displacement of the tire band from the band applier onto the tire building drum.

In addition to the rollers 38, a drive roller 46 is attached to the central tube 26 by pivotable scissors-like couplings essentially similar to those employed for attaching the rollers 38. This drive roller 46 is radially expandable to a radius of about two to five inches greater than that achieved by the rollers 38 during the radial expansion of the band applier 14 in order to provide contact between the drive roller 46 and the inner surface of the tire band 36 for effecting the rotation of the tire band 36 about the band applier 14 on the rollers 38. Further, the drive roller 46 is preferably tilted at a selected angle toward the front end of the band applier 14, i.e., the end thereof remote to the housing 28, in order to longitudinally displace the tire band 36 from the band applier 14 during rotation of the band 36 by the drive roller 46. The angle at which the drive roller 46 is positioned is normally in a range from about 3 to 10 degrees. Also, as shown in FIG. 6, the drive roller 46 and the air nozzle, as will be described below, are canted at a horizontal angle of about 5 degrees with respect to the longitudinal or rotational axis of the band applier 14 and the tire building drum 16 to facilitate the displacement of the tire band 36 onto the tire building drum. The drive roller 46 is shown coupled to a drive shaft 48 extending into the housing 28 where a suitable hydraulic, electric, or pneumatic drive motor is positioned for rotating the drive roller 46 at a speed which will provide the tire band 36 with essentially the same rotational speed as the tire building drum 16.

An air nozzle 50 is attached to the bearing-containing support 44 for the drive roller 46 and is utilized to facilitate the movement of the tire band 36 from the band applier 14 onto the drum 16. The air nozzle 50 is a open-ended, longitudinal extending tube provided with a plurality of rollers or rotatable disks of decreasing diameter along a tapered body which tapers upwardly from the base portion of the nozzle 50 attached to the bearing support 44 at essentially the same level as the outside surface of the drive roller 46 to the open end 51 of the air nozzle 50 in such a manner that the air nozzle 50 is provided with a planar upper surface which projects in a longitudinal plane essentially parallel to the outer surface of the drum 16. The purpose of the air nozzle 50, as briefly described above, is to provide for the longitudinal displacement of the tire band 36 from the band applier 14 onto the drum 16 when the band 36 is approximately half-way onto the tire building drum 16. This function of the air nozzle 50 is achieved by placing the air nozzle 50 in a position projecting a selected distance along the outside surface of the tire building drum 16 in a close spatial relationship therewith and any tire bands previously applied thereto so that as the tire band 36 is displaced from the rollers 38 onto the tire building drum 16 by the drive roller 46 with an assist from the rollers on the nozzle 50, the stream of high pressure air discharged through the end 51 of the nozzle 50 will form a layer of air in the annulus between the tire band 36 and the underlying drum 16 or the outermost tire band already thereon to facilitate the horizontal movement of the tire band 36 onto the tire building drum 16.

Figure 2:
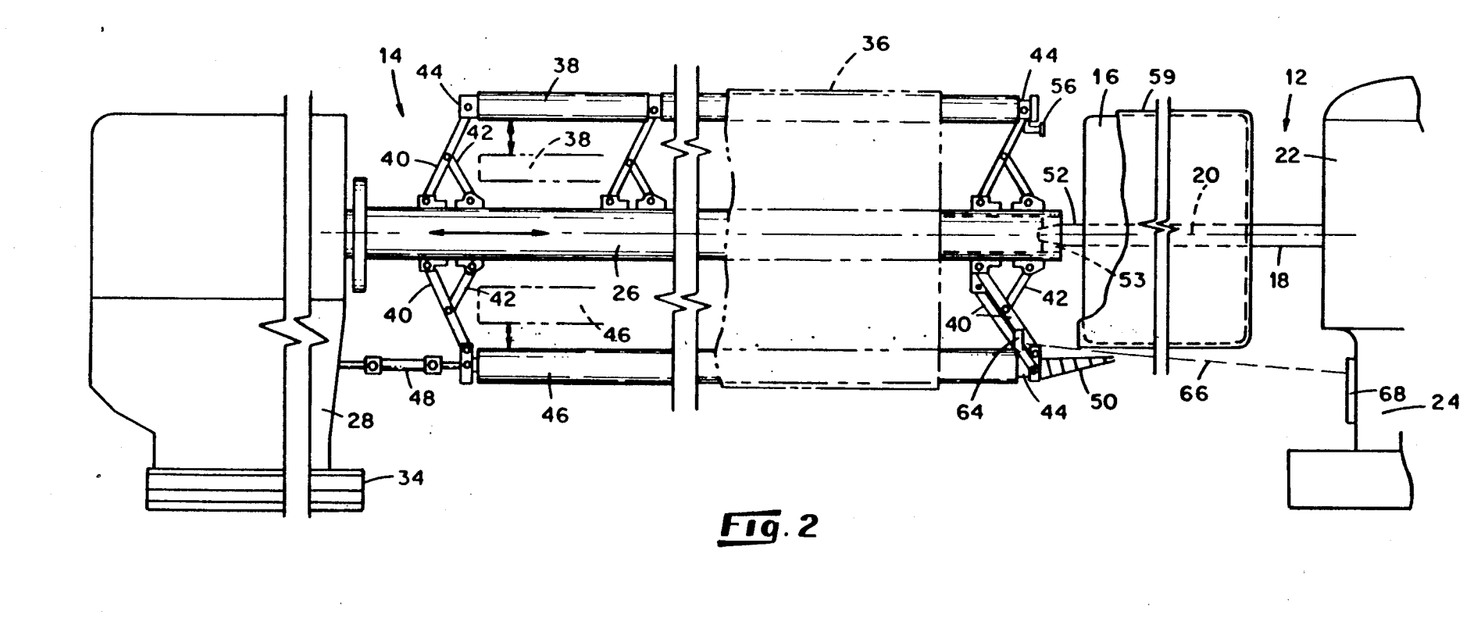
FIG. 2 is a schematic representation of the band applying mechanism showing details of the band applier and its relationship to the tire building drum during axial displacement of the band applier toward the tire building drum.
Figure 3:
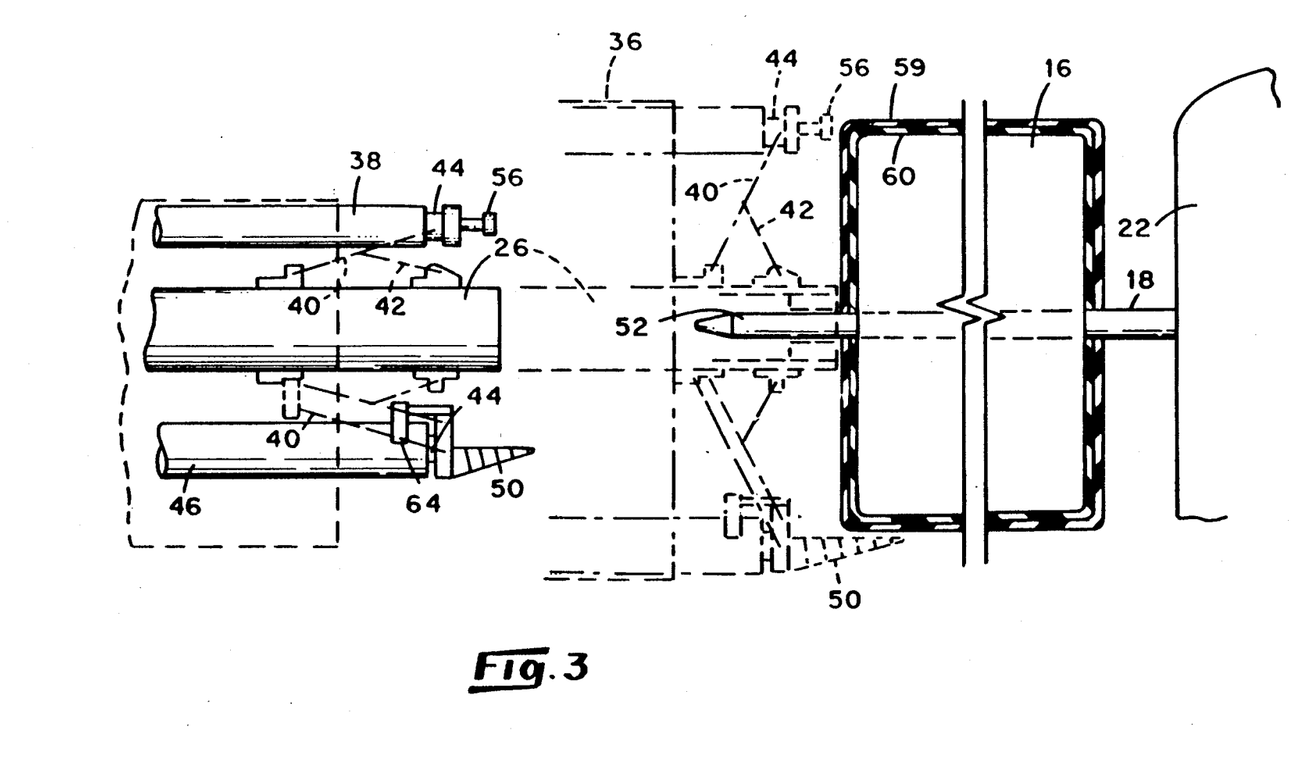
FIG. 3 shows further details of the band applier as it is expanded from a collapsed condition and positioned contiguous to the tire building drum for applying the tire band from the band applier onto the tire building drum.
Figures 4, 5:
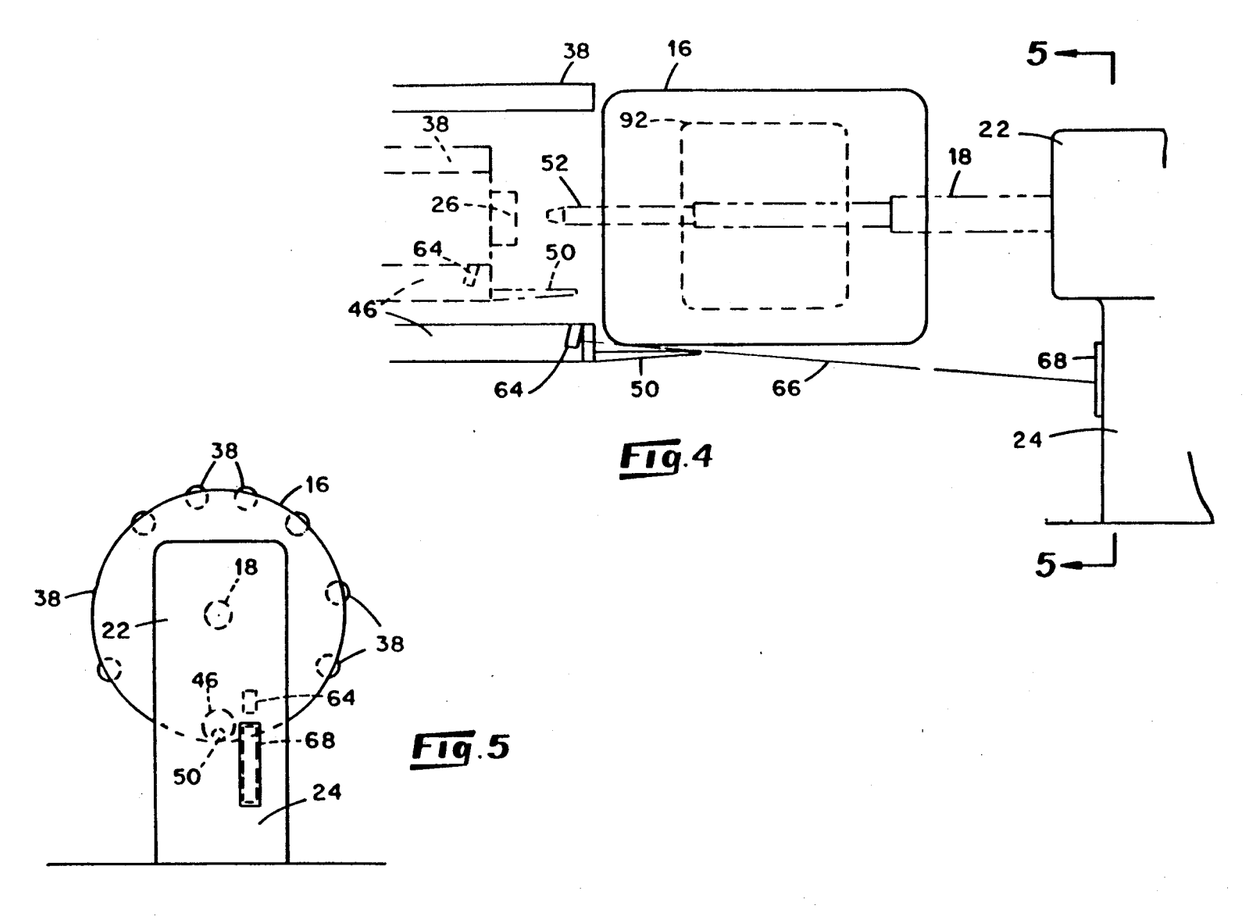
FIG. 4 is a schematic diagram showing details of the light sensing arrangement and the positioning thereof so as to sense the outer diameter of the tire building drum for controlling the radial expansion of the tire band applier.
FIG. 5 is an end view of FIG. 4 showing the diametrical relationship of the rollers of the band applier to the tire building drum when the tire band applier is expanded.

To apply a tire band 36 onto the tire building drum 16, the band applier 14 while in a collapsed state as generally shown by the dotted lines in FIGS. 2-4 is horizontally pivoted and a tire band 36 is slipped over the rollers 38 and 46. With the band 36 in position on the collapsed rollers 38, the band applier 14 is pivoted in axial alignment with the rotational axis 20 of the tire building drum 16. The tube 26 and the rollers 38 and 46 supported thereby are then longitudinally displaced from the housing 28 toward the drum 16 where an annular bearing assembly 53 in the central tube 26 receives therein a probe 52 on the end of the drive shaft 18 of drum 16 for facilitating alignment of the tube 26 with the shaft 18 and for providing a support-like coupling between the tube 26 and the shaft 18. This longitudinal displacement of the band applier 14 toward the tire building drum 16 is provided by a suitable drive coupling generally shown at 54 and extending between the axial drive and controller 30 and the tube 26. The longitudinal displacement of the tire band 36 from the rollers 38 and 46 onto the drum 16 is initiated when the leading ends of the expanded rollers 38 and 46 are axially moved into a position closely adjacent to the outboard edge of the drum 16 and any tire bands 36 previously attached thereto. This relative position of the rollers 38 and 46 to the drum is readily provided by employing a suitable sensor 56 which is capable of determining the spatial relationship of the rollers 38 and 46 to the tire building drum 16.

The sensor 56 is preferably a capacitive-type sensor attached to the bearing support 44 at the leading end of one of the rollers 38 for providing a signal through line 58 to the axial drive and controller 30 when the ends of the rollers 38 are moved into a location in the range of about 1.0 to about 1.5 inches from the outboard end of the drum 16 or the partial tire carcass thereon. The axial distance between the rollers 38 and the drum 16 can be varied to suit the particular conditions encountered by using a suitable potentiometer with the capacitive sensor 56 or by axially moving the support bracket for the sensor 56. Once the sensor 56 indicates that the desired spatial separation between the band applier 14 and the drum 16 is achieved, the operation of the axial drive 30 is terminated.

Substantially coincident with or immediately prior to this longitudinal displacement of the band applier 14 towards the tire building drum 16, the radial expansion of the rollers 36 and 48 away from the tube 26 is initiated by the radial driver and controller 32 in order to expand the tire band 36 to a diameter sufficient to be received on the rotatable drum 16 and any tire band previously applied thereon. Also, sufficient radial expansion of the band applier 14 must take place prior to the air nozzle 50 reaching the drum 16 in order to assure that the air nozzle 50 passes under or radially outwardly from the outside surface of the drum 16 during the longitudinal displacement of the band applier 14. The rollers 38 are preferably radially displaced from the central tube 26 a distance sufficient to provide the rollers 38 with a diameter at least as great and preferably slightly greater than the diameter of the drum 16 and any bands previously placed thereon, such as generally indicated at numerals 59 and 60. The radial expansion of the band applier 14 is terminated by the signal from and provided by the sensor 56 that is conveyed to the radial driver 32 by a lead or coupling generally shown at 61. With the band applier 14 axially positioned and expanded to desired diameter, the tire band 36 on the rollers 38 and 46 of the band applier 14 may be readily displaced therefrom onto the rotatable drum 16 as achieved by simultaneously rotating the drum 16 and band applier 14 for initially displacing the tire band 36 from the band applier 14 onto the drum 16 and then using the air stream through the air nozzle 50 to complete the loading of the band 36 onto the tire drum 16.

In order to control the radial expansion of the rollers 38 and 46 to the proper diameter for displacing the tire band 36 from the band applier 14 onto the drum 16 and to provide the desired clearance of the air nozzle 50 from the outer surface of the drum 16 and any bands thereon including the clearance of the air nozzle 50 from the end of the drum 16 during axial displacement of the band applier 14, an expansion sensing system as generally shown at 62 is utilized. In accordance with the present invention, an optical sensor 64 is mounted along with the air nozzle 50 to the bearing support 44 for drive roller 46. The sensor 64 is disposed radially inwardly from the outer surface of the drive roller 46 and is adapted to provide a signal upon encountering and detecting a beam of light generally shown at 66 projected or reflected from a suitable light emitter or reflector 68 mounted on the base 24 of the drum drive 22 at a location underlying the horizontal plane of the outer circumference of the drum 16. The sensor 64 is positioned at a preselected angle with respect to the rotational axis 20 of the drum 16 so that the light beam 66 sensed by the sensor 64 becomes periodically interrupted by the outboard edge of the drum 16 during the axial displacement of the band applier 14 toward the rotatable drum 16. In the present invention, the radial drive controller 32 is coupled to the sensor 64 by a lead or coupling 70 for controlling the extent of the radial expansion of the band applier 14 in accordance with the signals received from the sensor 64.

In the present instance the sensor 64 is designed to provide an operating signal to the radial driver controller 32 to expand the band applier 14 when the light beam 66 is interrupted or blocked by the outboard edge of the drum 16 and any tire band thereon, such as 59 and 60, which have been previously loaded onto the drum 16. This radial expansion of the band applier 14 continues until the sensor 64 is sufficiently radially displaced along with rollers 38 and 46 to again sense the light beam 66 and provide a signal to interrupt the operation of the radial drive 32. As the band applier 14 continues to be axially displaced towards the drum 16, the sensor 64 is again blocked from the light beam 66 by the outboard edge of the drum 16 or any tire bands thereon so as to again provide a signal to activate the radial expansion drive 32 until the light beam 66 is again sensed by the sensor 64. This intermittent operation of the radial expansion drive 32 as controlled by signals from the light sensor 64 continues until the capacitance sensor 56 provides a signal to the axial drive 30 and the radial drive 32 that the band applier 14 is positioned in the proper axial location for applying the band 36 onto the drum 16.

The radial expansion of the band applier 14 is controlled by the sensor 64 so as to provide the band applier 14 with a diameter sufficient for the displacement of the tire band 36 from the band applier 14 onto the drum 16 and any carcass-forming tire bands previously applied thereon. The radial expansion of the tubes is preferably sufficient to provide the rollers 38 with a diameter of about 1.0 inch to 1.5 inches greater than the rotatable drum 16 and any carcass-forming bands thereon. This difference in diameter between the rollers 38 and that of the rotatable drum 16 and any tire bands thereon has been found to be sufficient for wrinkle-free displacement of the tire band 36 from the band applier 14 onto the drum 16. Further, the radial expansion of the band applier 14 should be achieved at a time sufficiently early during the axial displacement of the band applier 14 towards the rotatable drum 16 so that the leading tip of the air nozzle 50 will pass radially outwardly from the outboard end of the drum 16 and thereby prevent any impact of the air nozzle 50 with the drum 16 or any tire bands thereon.

The clearance of the air nozzle 50 from the edge of the drum 16 is preferably at least one-fourth of an inch and not more than about five-eighths of an inch from the outboard edge of the drum 16 and any tire bands previously applied thereon. This relatively small spatial separation or clearance between the air nozzle 50 and the outboard edge of the drum 16 is preferred since the air nozzle 50 will continue to move radially away from the drum 16 as the band applier 14 continues to move toward the rotatable drum 16 so as to position the air nozzle 50 at an even greater radial distance from the rotatable drum 16. The final spatial separation between the drum 16 and any tire bands thereon and the air nozzle 50 should be maintained in a range from one-half inch to three inches so as to prevent overly stretching the tire band 36 as well as to facilitate the movement or displacement of the band 36 from the band applier 14 onto the rotatable drum 16.

In order to provide for the initial clearance between the nozzle 50 and the rotatable drum 16 at the outboard end of the drum 16 as well as to maintain a relatively small increment of radial movement of the air nozzle 50 from the rotatable drum 16 as it is moved into its final position, the sensor 64 is mounted in such a position on the band applier 14 as to provide and/or receive the light beam 66 at a angle as close to parallel with the rotatable axis 20 of the drum 16 as possible. The use of smaller angles will result in smaller increases in the final spatial separation between the drum 16 and the air nozzle 50 since the air nozzle 50 will travel radially outwardly at the same angle at which the sensor 64 is set.

With the sensor 64 set at an angle in a range from about 4 to 5 degrees the final spatial separation between the air nozzle 50 and the drum 16 was found to be adequately small to permit the movement of the band 36 onto the drum without encountering problems. However, with the sensor 64 set at an angle greater than about 5 degrees the spacing between the outer surface of the drum 16 and any bands previously applied thereon and the air nozzle 50 may be sufficiently excessive so as to introduce wrinkling and other undesirable problems in the band 36 as well as inhibiting or detracting from the displacement of the tire band 36 from the band applier 14 onto the drum 16.

The light sensing system 62 utilized in the present invention may be of any suitable type. For example, a light beam may be projected from the source 68 and be received by the sensor 64. In such an instance, the light beam would be provided by an elongated vertically extending light source capable of projecting a vertical curtain of light at the selected angle so that the sensor 64 can sense the light beam 66 for effecting the radial expansion of the band applier 14 regardless of the diameter of the drum 16 and any tire bands thereon. Also, the type of light used for providing the light beam 66 can be of any suitable type such as infrared, incandescent, laser and the like, but is preferably of a type differing from that of the other light sources used in the proximity of the band applier 14 to assure that spurious light signals from these other sources will not interfere with the desired expansion of the band applier 14.

Preferably, the sensing system 62 is provided by a retroreflective photoelectric scanner. This scanner provides an infra-red light beam which is reflected from the reflector 68 back to a light sensor in the scanner. By using a retroreflective photoelectric scanner it is assured that the sensor 64 must first be in the proper radial position in order to project a light beam 66 to the reflector 68 for reflection back to the sensor 64. Also, by using such an arrangement spurious light signals from any light source contacting the reflector 68 will not be received by the sensor 64 unless it is the infra-red light beam projected from the scanner.

A suitable retroreflective photoelectric photo scanner of the type useful in the practice of the present invention is commercially available as the Warner MCS-164 A Series. This photo scanner is commercially available from Warner Electric, Motion Control Systems Division, 1330 N. State Street, Marengo, Ill. 60152. This photo scanner provides a completely self-contained retroreflective photoelectric control with an LED light source, sensor, power supply, amplifier, and a output relay. This particular scanning system can be readily utilized in the present invention to provide the operating signal to the radial drive controller 32 through lead 70. When utilizing the photo scanner of this type, the reflector 68 is preferably provided by a reflective tape. A suitable reflective tape is available from the aforementioned Warner Electric Company as Part No. 7150-101-028. This tape is capable of reflecting the infra-red light beam from the LED-light source in the scanner back to the light sensor in the scanner when it is received by the reflector 68 regardless of the angle at which the light beam 66 is projected to the reflector 68 from the LED in the scanner.

Figure 7:
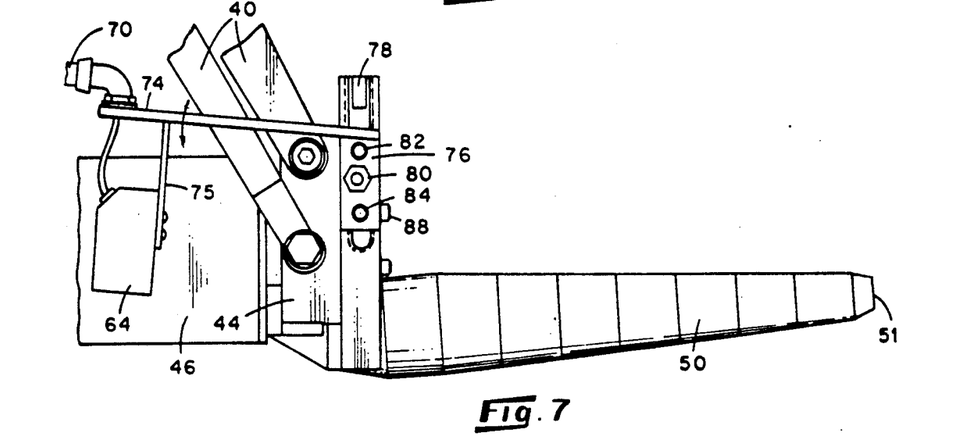
FIG. 7 is an elevational side view showing details of the adjustable mounting arrangement of the light sensing means and the air nozzle and the relationship of the light sensing means to the air nozzle as provided by the present invention.
Figure 8:
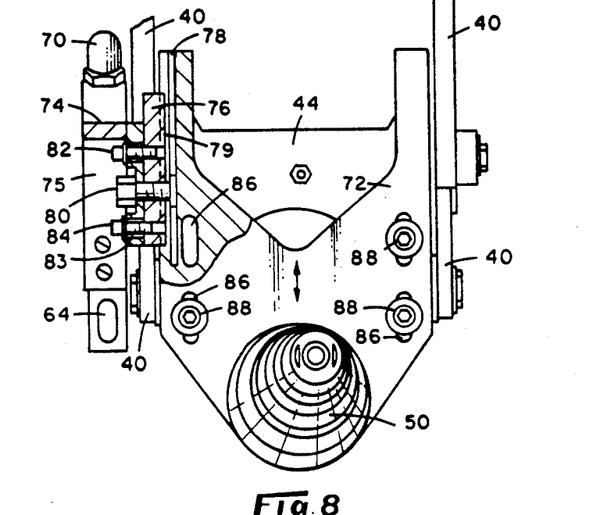
FIG. 8 is an elevational front view of the FIG. 7 embodiment showing further details of the adjustable mounting arrangement for selectively positioning the air nozzle and/or the light sensing means.

With reference to FIGS. 7 and 8, the light sensor or scanner 64 is shown attached to the bracket 72 used for supporting the air nozzle 50 on the bearing support 44. This attachment is provided by a longitudinal extending arm 74 with a bracket 75 vertically extending from one end thereof for supporting the sensor 64 by a suitable bolting arrangement. The other end of the arm 74 is attached to a vertically extending flange 76 which is connected to the air nozzle bracket 72 in a vertically adjustable and pivotable manner. A suitable mounting arrangement for attaching the flange 76 to the air nozzle bracket 72 is achieved by providing the outside vertical edge of the air nozzle bracket 72 with a vertical, T-shaped slot 78 and providing the flange 76 with a vertically extending T-shaped lip body 79 on the edge thereof for insertion into the slot 78. A bolt 80 extends through the flange 76 and bears against the bracket 72 at the base of the slot 78 to fasten the flange 76 to the bracket 72 and provide the flange 76 with selected vertical positioning with respect to the air nozzle bracket 72.

The vertical displacement of the flange 76 in either direction with respect to the bracket 72 is utilized to control the final diameter achieved by the rollers 38 when the band applier 14 is expanded. For example, if the flange 76 and the sensor 64 attached thereto is moved upwardly with respect to the bracket 72 and the bearing support 44, the rollers 38 and 46 will be expanded to a greater diameter since the sensor 64 will be positioned at a higher level so that the light beam 66 will be blocked by the drum for a greater period of time to permit greater radial expansion to occur. Conversely, if the sensor 64 is lowered, the difference in roller diameter to the drum diameter will be decreased. Normally, it is desirable to maintain a roller diameter in the range of about 1.0 inch less to about 1.5 inches greater than the diameter of the drum 16 and any tire bands such as 59 and 60 previously applied thereon.

Bolts 82 and 84 also extend through bores 83 in the flange 76 that are substantially larger than the diameter of the bolts 82 and 84 so as to permit angular adjustment of the sensor 64 with respect to the air nozzle 50. This angular adjustment provides for adjusting the angle which the light beam 66 is projected from and/or received by the sensor 64. The vertical adjustment of the sensor 64 relative to the air nozzle 50 along with the angular adjustment achieved by using the bolts 82 and 84 are utilized to determine the spatial relationship of the air nozzle 50 to the outer diameter of the drum 16 after the radial expansion of the band applier 14 is achieved. During the radial expansion of the rollers 38 and 46, the sensor 64 should be positioned so that the end of the air nozzle 50 passes by the outboard end of the drum 16 by at least one-fourth inch but not more than five-eighths of an inch. If the sensor angle is increased by loosening the bolts 82 and 84 and tilting the bracket 74 upwardly, the air nozzle 50 can be set to pass under the drum 16 by the specified clearance but will end up considerably further away from the outer diameter of the drum since, as mentioned above, the air nozzle 50 radially travels at the same angle at which the sensor 64 is set. The air nozzle 50 and the sensor 64 may also be vertically adjusted as a single unit with respect to the roller 46 by providing the bracket 72 with vertical slots 86 through which bolts 88 extend for attaching the air nozzle bracket 72 to the bearing support 44. The vertical adjustment of the air nozzle 50 by the bolts 88 in the slots 86 can be used like the vertical movement of the flange 76 in flange 72 to regulate the relation of the outer diameter of the rollers 38 with respect to the outer diameter of the drum and any bands previously applied thereon. By moving both the air nozzle and the sensor 64 the initial clearance of the air nozzle 50 from the outboard end of the drum 16 can be readily selected.

By providing the expandable band applier 14 with the signal beam sensing system 62 as envisioned by the present invention, a desired diametrical relationship of the band applier 14 to that of the rotatable drum 16 may be readily obtained in a automatic and repetitive manner since the band applier 14 will be radially expanded to the desired diameter with respect to the drum diameter and any bands previously applied thereon regardless of the number of previously applied bands or the initial diameter of the rotatable drum. For example, as generally shown in FIG. 4, the present invention is useable with tire building drums of diameters in a range varying from a drum with a relative small diameter as generally shown at 92 to a drum with a larger diameter as indicated by that of the drum 16.

In as much as the light sensing system 62 will provide for the desired radial expansion of the band applier 14 with drums in a relatively wide range of diameters as well as with such drums containing several layers of the tire bands, the light reflector 68 is preferably in a relatively long, vertically oriented configuration such as shown is FIGS. 4 and 5 so as to assure that the light reflection or projection of the light from 68 will be available to the sensor 64 throughout the range of drum diameters with or without tire bands thereon.

Figure 9:
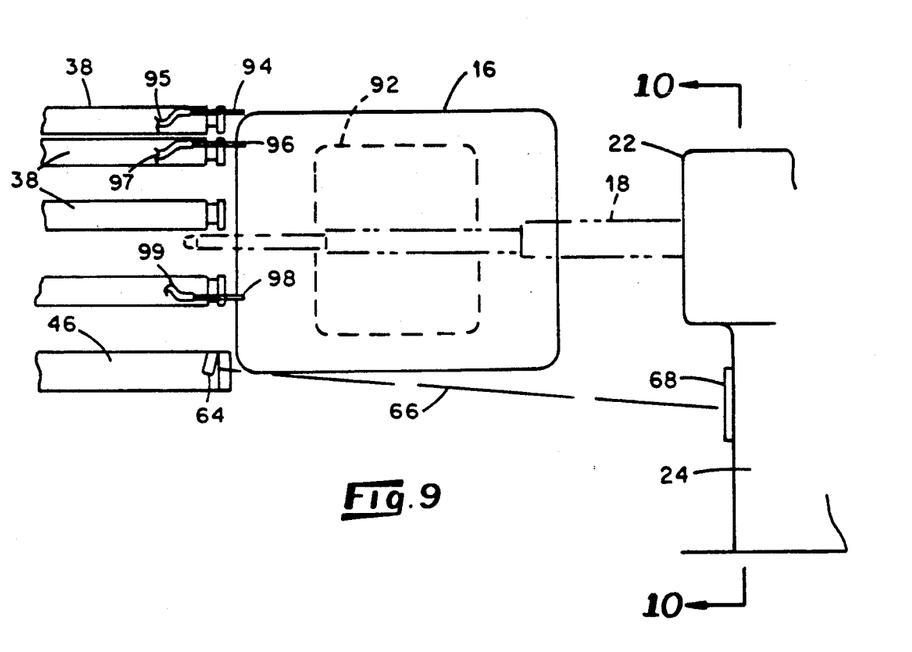
FIG. 9 is a schematic elevational view of the band applier illustrating a further embodiment of the present invention wherein air jets are affixed to several of the rollers at the outboard end thereof and are used in place of the air nozzle.
Figure 10:
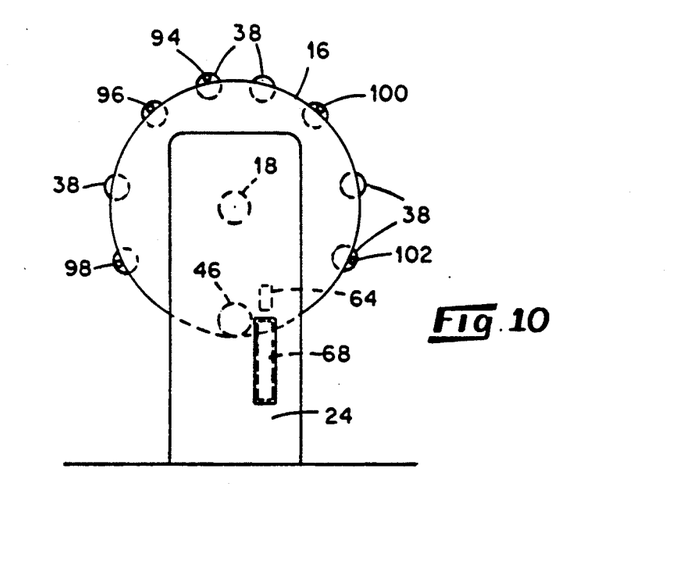
FIG. 10 is a schematic end view taken along line 10—10 of FIG. 9 and showing further details of the air jet arrangement on the outboard end of the rollers.

The above described embodiment of the present invention can be modified by replacing the air nozzle 50 with a plurality of air jets on the outboard end of several of the rollers 38. These air jets are utilized to direct several streams of high pressure air between the tire band being applied and the tire building drum 16 and any tire bands previously applied thereon for the same purposes as the air stream from the air nozzle 50. As schematically illustrated in FIGS. 9 and 10, a plurality of elongated tubes 94, 96, 98, 100 and 102 provide these air jets and are each attached at one end thereof to the bearing support 44 of each of a plurality of rollers 38 at a location adjacent the outboard end of the roller 38. These tubes are preferably disposed in suitable recesses in the bearing supports 44 with the surface of each tube radially outermost from the rotational axis 20 being in substantially the same longitudinal plane as outer surface of the roller 38 supporting the particular tube so as to provide minimal interference with the displacement of the tire band from the tire applier 14 onto the drum 16. Each tube 94, 96, 98, 100 or 102 longitudinally extends beyond the outboard end of the rollers 38 along a plane substantially parallel with the rotational axis 20 so that the distal end portions of each tube will extend over the radially outermost surface of the tire building drum 16 and any tire bands thereon when the tire applier 14 is positioned in the tire band transferring location adjacent to the drum 16. Preferably, these tubes longitudinally project over the surface of the tire building drum a distance in the range of about one-fourth to about three-fourth inch, which distance is sufficient to assure that the air streams directed through the tubes will provide a layer of air under the band being applied for effecting the desired tire-band moving function. Also, these tubes are preferably spaced from the outer surface of the drum 16 and any tire bands thereon a distance of about three-eighths to about three-fourths inch to assure that the tubes do not contact the outer surface of the drum 16 or any tire bands already thereon.

As with the air nozzle 50, the sensor 64 is positioned to provide sufficient radial expansion of the band applier so that the ends of the tubes 94, 96, 98, 100 and 102 will clear the outboard end of the tire building drum 16 and any tire bands thereon as the tire applier 14 is moved into position adjacent to the tire building drum 16. Each of these tubes are coupled to a suitable air supply (not shown) through suitable conduits such as generally shown at 95, 97 and 99 in FIG. 10. While five tubes 94, 96, 98 100 and 102 are disposed on rollers 38 at circumferentially spaced apart locations as shown in FIG. 10, it will appear clear that any desired number of tubes may be used and that the selected number of tubes may be deployed in various circumferential positions.

As briefly mentioned above, the signal beam 66 may be provided by a beam of sonic waves rather than beam from a source of light as in the preferred embodiment. When using a sonic beam a suitable sonic wave generator may be supported on the base 24 of the tire building drum 16 in place of the reflector 68 and the sensor 64 may be replaced with a suitable signal-generating receiver. Satisfactory results have been achieved by using a sonic beam transmitted at a frequency in the range of about 20 to 40 hz.

It will be seen that the present invention provides a significant improvement in the control of the band applier in that the band applier is automatically and accurately expanded to the proper diameter for applying tire bands onto a rotating tire drum regardless of the initial tire drum diameter or the number of bands previously applied thereto.

What is claimed is:

1. Apparatus for building a multiple-ply tire carcass incorporating a plurality of tire bands and employed in combination with an elongated cylindrical drum means rotatable about a longitudinal axis for sequentially receiving about the peripheral surface thereof a plurality of concentrically disposed cylindrical tire bands, comprising an elongated radially expandable and collapsible band applying means positionable along the longitudinal axis for supporting thereabout a tire band of an elongated cylindrical configuration and for displacing the tire band therefrom over the peripheral surface of the cylindrical drum means and any tire band thereon, first drive means for radially expanding the band applying means circumferentially away from the longitudinal axis, second drive means for displacing the band applying means towards said drum means along said longitudinal axis for positioning an end of the band applying means at a location contiguous to one end of the drum means, sensing means coupled to said second drive means for stopping the displacement of the band applying means along said longitudinal axis when said end of the band applying means is at a said location contiguous to said one end of the drum means, and signal beam sensing means disposed at said end of the band applying means and radially expandable therewith and coupled to the first drive means for providing signals thereto in response to a signal beam oriented at a preselected angle with respect to the longitudinal axis of said drum means such that during the axial displacement of the band applying means towards the drum means the signal beam is periodically interrupted by the peripheral surface of the drum means and any tire band thereon for controlling the radial expansion of the band applying means during the displacement of the band applying means towards said drum means.

2. Apparatus for building a multiple-ply tire carcass as claimed in claim 1, wherein said signal beam is a beam of light, wherein the signal beam sensing means comprises light sensing means for sensing a beam of light extending from a location adjacent an end of the drum means opposite said one end over the peripheral surface of the drum means and any band thereon along a path at an angle to said longitudinal axis, wherein said light sensing means provide signals to the first drive means at least during the displacement of the band applying means towards said drum means by said second drive means for respectively effecting radial expansion of the band applying means in response to the light sensing means being blocked from the light beam by the drum means and any band thereon and for interrupting the radial expansion of the band applying means in response to the light sensing means being sufficiently radially displaced from the longitudinal axis during the expansion of the band applying means for receiving the light beam to provide the tire band supportable by the band applying means with an inner diameter greater than the outer diameter of the drum means and any band thereon.

3. Apparatus for building a multiple-ply tire carcass as claimed in claim 2, including air discharge means disposed on said one end of the band applying means for directing a stream of high pressure air between the tire band being displaced from the band applying means and the drum means and any tire band thereon.

4. Apparatus for building a multiple-ply tire carcass as claimed in claim 3, wherein said air discharge means comprises a plurality of elongated tubes circumferentially spaced about the circumference of the band applying means and longitudinally extending from said end of the band applying means for positioning a portion of each of the elongated tubes at a location radially outwardly from the peripheral surface of the drum means and any tire band thereon when said end of the band applying means is in said location.

5. Apparatus for building a multiple-ply tire carcass as claimed in claim 3, wherein said air discharge means comprises elongated air nozzle means disposed on said end of the band applying means and extending therefrom along a longitudinal plane substantially parallel to said longitudinal axis for positioning a substantial portion of the air nozzle means at a location radially outwardly from the peripheral surface of the drum means and any tire band thereon when said one of the band applying means is in said location.

6. Apparatus for building a multiple-ply tire carcass as claimed in claim 2, wherein the periodic interrupting of said signal beam provides a plurality of discrete signals to the first drive means during said displacement of the band applying means towards said one end of the drum means for sequentially and incrementally expanding said band applying means.

7. Apparatus for building a multiple-ply tire carcass as claimed in claim 2, wherein the periodic interrupting of the signal beam periodically blocks the light sensing means from receiving the light beam for providing a signal to the first drive means to effect radial expansion of the band applying means until said light sensing means again senses the light beam.

8. Apparatus for building a multiple-ply tire carcass as claimed in claim 5, wherein the light sensing means are disposed at a location on said end of the band applying means spaced sufficiently radially inwardly from the air nozzle means for sensing the light beam when the longitudinal end of the air nozzle means remote to said end of the band applying means is adjacent to said one end of the drum means and in a longitudinal plane overlying the peripheral surface of the drum means and any band thereon to position the air nozzle means a selected distance from the peripheral surface of the drum means and any band thereon.

9. Apparatus for building a multiple-ply tire carcass as claimed in claim 8, wherein said light sensing means are positioned at a location sufficiently radially inwardly from the outer periphery of the band applying means and the air nozzle means to sense the light beam for providing a signal to the first drive means to interrupt the expansion of the band applying means when said longitudinal end of the air nozzle means is radially outwardly spaced a selected distance from the peripheral surface of the drum means and any tire band thereon at said one end of the drum means.

10. Apparatus for building a multiple-ply tire carcass as claimed in claim 9, wherein said selected distance is in the range of about one-fourth to about five-eighths inch.

11. Apparatus for building a multiple-ply tire carcass as claimed in claim 9, wherein the light sensing means are disposed at a selected angle to the longitudinal axis that is sufficient to receive said light beam and position the air nozzle means in a location at a preselected distance radially outwardly from the drum means and any tire band thereon when said band applying means are displaced to said location contiguous to said one end of the drum means.

12. Apparatus for building a multiple-ply tire carcass as claimed in claim 11, wherein said preselected angle is in the range of about 4 to about 5 degrees, and wherein said preselected distance is in the range of about one-fourth to about five-eighths inch.

13. Apparatus for building a multiple-ply tire carcass as claimed in claim 11, wherein said light sensing means are attached to the air nozzle means by vertically adjustable means for vertically positioning the light sensing means with respect to the air nozzle means and the band applying means to sense the light beam and interrupt the expansion of the band applying means when the tire band supported thereby has an inner diameter in the range of about 1.0 inch to about 1.5 inches greater than the outer diameter of the drum means and any tire band thereon.

14. Apparatus for building a multiple-ply tire carcass as claimed in claim 13, wherein said light sensing means are attached to said air nozzle means by angularly adjustable means for angularly positioning the light sensing means at said selected angle.

15. Apparatus for building a multiple-ply tire carcass as claimed in claim 9, wherein said light sensing means are attached to said air nozzle means, wherein said air nozzle means are attached to the band applying means by vertically adjustable means for vertically moving the air nozzle means and the light sensing means attached thereto with respect to the band applying means to provide said selected distance between said longitudinal end of the air nozzle means and the peripheral surface of the drum means and any tire band thereon.

16. Apparatus for building a multiple-ply tire carcass as claimed in claim 2, wherein said light sensing means comprises a light source for providing said light beam, wherein reflector means are disposed radially outwardly from the drum means at a location vertically spaced from the end of the drum means opposite said one end for reflecting the light beam from said light source back to the light sensing means, and wherein the light sensing means further comprises a sensor for sensing the reflected light beam.

17. Apparatus for building a multiple-ply tire carcass as claimed in claim 1, wherein said sensing means are coupled to said first drive means for stopping radial expansion of the band applying means when said end of the band applying means is at said location contiguous to said one end of the drum means.

* * * * *